(12) United States Patent
Arai

(10) Patent No.: US 11,390,279 B2
(45) Date of Patent: Jul. 19, 2022

(54) VEHICLE CONTROL METHOD AND VEHICLE CONTROL SYSTEM

(71) Applicant: NISSAN MOTOR CO., LTD., Yokohama (JP)

(72) Inventor: Takahisa Arai, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/963,409

(22) PCT Filed: Jan. 23, 2018

(86) PCT No.: PCT/JP2018/001985
§ 371 (c)(1),
(2) Date: Jul. 20, 2020

(87) PCT Pub. No.: WO2019/146001
PCT Pub. Date: Aug. 1, 2019

(65) Prior Publication Data
US 2021/0070293 A1 Mar. 11, 2021

(51) Int. Cl.
*B60W 30/17* (2020.01)
*B60W 10/04* (2006.01)
*B60W 30/18* (2012.01)

(52) U.S. Cl.
CPC ............ *B60W 30/17* (2013.01); *B60W 10/04* (2013.01); *B60W 30/18018* (2013.01); *B60W 2510/105* (2013.01); *B60W 2554/406* (2020.02)

(58) Field of Classification Search
CPC .................................................. B60W 30/17
See application file for complete search history.

(56) References Cited

U.S. PATENT DOCUMENTS

| 6,370,470 | B1 * | 4/2002 | Yamamura | B60W 30/16 |
| | | | | 701/91 |
| 10,471,960 | B2 * | 11/2019 | Heo | B60W 30/16 |
| 2009/0164082 | A1 * | 6/2009 | Kobayashi | B60K 31/0008 |
| | | | | 701/96 |
| 2015/0166062 | A1 * | 6/2015 | Johnson | B60W 10/20 |
| | | | | 701/41 |

(Continued)

FOREIGN PATENT DOCUMENTS

| CN | 107539314 A | * | 1/2018 | |
| CN | 109677412 A | * | 4/2019 | B60W 10/06 |

(Continued)

*Primary Examiner* — Shelley Chen
(74) *Attorney, Agent, or Firm* — Foley & Lardner LLP

(57) ABSTRACT

Provided is a vehicle control method that performs basic self-driving control configured to automatically control the travel of a host vehicle based on an intervehicle distance between the host vehicle and a preceding vehicle. When a traffic jam on a travel lane of the host vehicle is detected, low torque travel control configured to cause the host vehicle to travel by a drive torque lower than a drive torque determined based on the basic self-driving control is performed, and when the intervehicle distance exceeds, in the low torque travel control, a predetermined upper limit distance larger than a set during-vehicle-stop intervehicle distance serving as a reference for the start or the stop of the host vehicle in the basic self-driving control, the low torque travel control is switched to the basic self-driving control.

4 Claims, 8 Drawing Sheets

(56) References Cited

U.S. PATENT DOCUMENTS

| | | | | |
|---|---|---|---|---|
| 2017/0327116 A1* | 11/2017 | Heo | ................... | B60W 30/16 |
| 2018/0215386 A1* | 8/2018 | Naserian | ............. | F02N 11/0837 |
| 2018/0330617 A1* | 11/2018 | Wei | ................... | B60W 30/08 |
| 2019/0071067 A1* | 3/2019 | Leone | ................. | F02N 11/0837 |
| 2019/0135302 A1* | 5/2019 | Kishi | ................ | B60W 10/184 |
| 2021/0046932 A1* | 2/2021 | Kegelman | ................ | G08G 1/22 |

FOREIGN PATENT DOCUMENTS

| | | | | | |
|---|---|---|---|---|---|
| FR | 3040960 | A1 | * | 3/2017 | ............ B60W 30/16 |
| JP | 7-137561 | A | | 5/1995 | |
| JP | 3620359 | B2 | * | 2/2005 | ......... B60K 31/0008 |
| JP | 2007263093 | A | * | 10/2007 | |
| JP | 2008-87562 | A | | 4/2008 | |
| JP | 2009166824 | A | * | 7/2009 | ......... B60K 31/0008 |
| JP | 2009268174 | A | * | 11/2009 | |
| JP | 2016-169685 | A | | 9/2016 | |
| JP | 2016169685 | A | * | 9/2016 | |
| JP | 2017-87784 | A | | 5/2017 | |
| JP | 2017087784 | A | * | 5/2017 | |

* cited by examiner

VEHICLE CONTROL METHOD AND VEHICLE CONTROL SYSTEM

TECHNICAL FIELD

The present invention relates to a vehicle control method and a vehicle control system.

BACKGROUND ART

JP2017-87784A discloses a driving support system including a traffic jam detection means configured to detect that the travel lane of a vehicle is jammed, and a control means configured to detect a traffic jam by the traffic jam detection means and to cause the vehicle to creep at a speed with a creep torque when a preceding vehicle is started so that the intervehicle distance becomes equal to or larger than a predetermined distance in a vehicle stop state in which the vehicle speed detected by a vehicle speed detection means is zero.

SUMMARY OF INVENTION

However, a scene is conceivable in which even in the traffic jam, the preceding vehicle is accelerated for a reason that a space is temporarily formed ahead of the preceding vehicle, or the like. Assuming that the control in the driving support system of JP2017-87784A is used in such a scene, it is conceivable that the vehicle speed difference between the preceding vehicle and the creeping host vehicle becomes large so that the intervehicle distance increases excessively. As a result, there is a possibility of provoking another vehicle to cut in line between the vehicle and the preceding vehicle.

It is therefore an object of the present invention to provide a vehicle control method that can suppress cutting in line by another vehicle.

An aspect of the present invention provides a vehicle control method that performs basic self-driving control configured to automatically control travel of a host vehicle based on an intervehicle distance between the host vehicle and a preceding vehicle, the vehicle control method comprising performing low torque travel control when a traffic jam on a travel lane of the host vehicle is detected, the low torque travel control configured to cause the host vehicle to travel by a drive torque lower than a drive torque determined based on the basic self-driving control, and switching the low torque travel control to the basic self-driving control when the intervehicle distance exceeds, in the low torque travel control, a predetermined upper limit distance larger than a set during-vehicle-stop intervehicle distance serving as a reference for start or stop of the host vehicle in the basic self-driving control.

An aspect of the present invention provides a vehicle control system for automatically controlling travel of a host vehicle based on an intervehicle distance between the host vehicle and a preceding vehicle, the vehicle control system comprising an intervehicle distance acquisition device configured to acquire the intervehicle distance, a host vehicle speed acquisition device configured to acquire a vehicle speed of the host vehicle, a vehicle speed difference acquisition device configured to acquire a vehicle speed difference between the host vehicle and the preceding vehicle, a traffic jam information acquisition device configured to acquire traffic jam information indicating whether or not a travel lane of the host vehicle is jammed, and a self-driving controller configured to control the travel of the host vehicle based on the intervehicle distance, the vehicle speed difference, and the traffic jam information, wherein the self-driving controller is configured to when it is determined that the intervehicle distance is larger than a set during-vehicle-stop intervehicle distance serving as a reference for start or stop of the host vehicle, determine based on the traffic jam information whether or not the travel lane is jammed, when it is determined that the travel lane is not jammed, perform basic self-driving control including intervehicle maintaining control configured to maintain the intervehicle distance in a predetermined range based on the vehicle speed difference, when it is determined that the travel lane is jammed, perform in-traffic-jam self-driving control including low torque travel control configured to cause the host vehicle to travel by a drive torque lower than a drive torque determined based on the basic self-driving control, and when the intervehicle distance exceeds, in the low torque travel control, a predetermined upper limit distance larger than the set during-vehicle-stop intervehicle distance, switch the in-traffic-jam self-driving control to the basic self-driving control.

DESCRIPTION OF EMBODIMENTS

An embodiment of the present invention will be described below with reference to the drawings and so on.

First Embodiment

Figure 1:
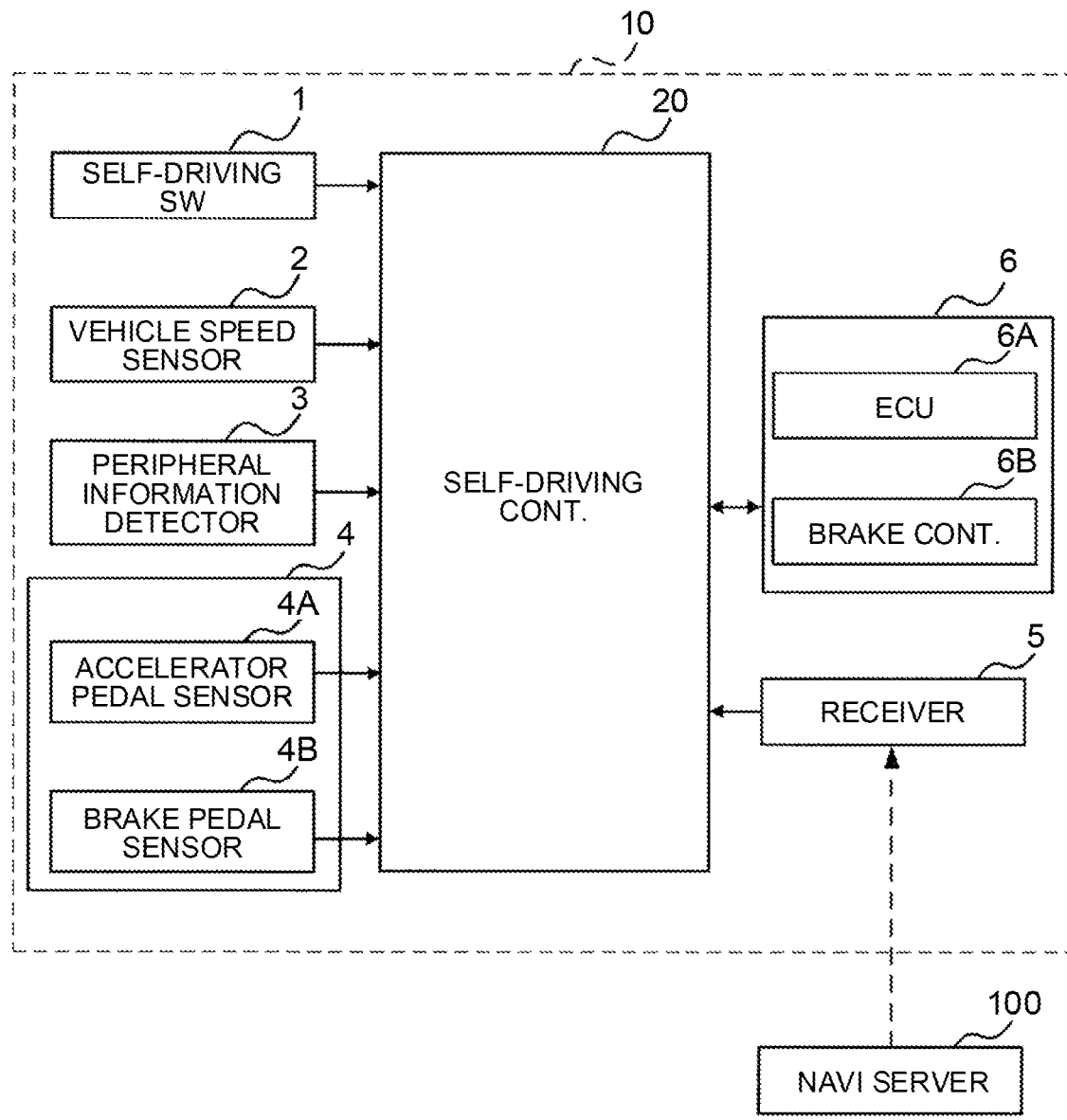
FIG. 1 is a diagram for explaining the configuration of a vehicle control system according to this embodiment.

A first embodiment will be described with reference to FIGS. 1 to 8. FIG. 1 is a configuration diagram of a vehicle control system 10 according to the first embodiment.

As illustrated, the vehicle control system 10 includes a self-driving switch 1, a vehicle speed sensor 2 that functions as a host vehicle speed acquisition device, a peripheral information detector 3 that functions as an intervehicle distance acquisition device and a vehicle speed difference acquisition device, a driving operation detection means 4, a receiver 5, a travel control device 6, and a self-driving controller 20, and is installed in a vehicle (hereinafter referred to as the "host vehicle").

The host vehicle equipped with the vehicle control system 10 according to this embodiment includes an internal combustion engine (hereinafter referred to as the engine) as a drive source and travels by a driving force generated by the engine.

The self-driving switch 1 is a switch for switching between the start and the end of a self-driving mode that automatically performs acceleration/deceleration (including starting or stopping) regardless of a driver's operation. The self-driving switch 1 is provided in a vehicle cabin at a position that enables an operation by the driver or the like. Switch operation information on on/off of the self-driving switch 1 is output to the self-driving controller 20.

The vehicle speed sensor 2 is a sensor for detecting a vehicle speed Vs_s of the host vehicle and forms a vehicle speed acquisition device of this embodiment. The vehicle speed sensor 2 is formed by, for example, a pulse generator such as a rotary encoder that measures a wheel speed. Wheel speed information detected by the vehicle speed sensor 2 is output to the self-driving controller 20.

The peripheral information detector 3 recognizes peripheral information such as a preceding vehicle or a traffic light located ahead of the host vehicle. In particular, in this embodiment, the peripheral information detector 3 detects an intervehicle distance Dv and a vehicle speed difference ΔVs between the host vehicle and the preceding vehicle.

The peripheral information detector 3 is formed by, for example, a radar device. The peripheral information detector 3 calculates an intervehicle distance Dv and a vehicle speed difference ΔVs between the host vehicle and the preceding vehicle from measured values obtained by radar and outputs them to the self-driving controller 20. The calculation of the intervehicle distance Dv and the vehicle speed difference ΔVs from the measured values obtained by radar may be performed by the self-driving controller 20.

The driving operation detection means 4 includes an accelerator pedal sensor 4A for detecting an operation of an accelerator pedal by the driver and an operation amount thereof, and a brake pedal sensor 4B for detecting an operation of a brake pedal by the driver and an operation amount thereof. The driving operation detection means 4 outputs a detection signal of the accelerator pedal sensor 4A and a detection signal of the brake pedal sensor 4B to the self-driving controller 20.

The receiver 5 receives traffic jam information of a travel lane, on which the vehicle is traveling, from a navigation server 100 disposed outside the vehicle control system 10. The navigation server 100 is, for example, a known traffic jam information detection system that detects location information of the vehicle by a GPS (global positioning system) and generates, based on the detected location information, traffic jam information indicating whether or not the travel lane of the vehicle is jammed.

The travel control device 6 includes an engine controller 6A and a brake controller 6B. The engine controller 6A controls the throttle valve opening degree of the engine being the drive source based on a command (target acceleration $\alpha\_t$) from the self-driving controller 20. Likewise, the brake controller 6B controls the braking force by adjusting the hydraulic pressure of a hydraulic brake or the regenerative electric power by a regenerative brake based on the command (target acceleration $\alpha\_t$) from the self-driving controller 20.

In terms of accepting a normal driving operation (non-self-driving) of the host vehicle by the driver, the engine controller 6A is programmed to be able to control the throttle valve opening degree based on the detection signal of the accelerator pedal sensor 4A. Further, the brake controller 6B is programmed to be able to control the hydraulic brake or the like based on the detection signal of the brake pedal sensor 4B.

When the self-driving controller 20 detects that the self-driving switch 1 is in the on-state, the self-driving controller 20 controls the travel of the host vehicle automatically based on the vehicle speed Vs_s of the host vehicle detected by the vehicle speed sensor 2, the intervehicle distance Dv and the vehicle speed difference ΔVs between the host vehicle and the preceding vehicle detected or measured by the peripheral information detector 3, the traffic jam information received by the receiver 5, and so on.

More specifically, the self-driving controller 20 calculates, based on these various information, a target acceleration $\alpha\_t$ being an acceleration (including also a deceleration) to be achieved by the host vehicle and outputs this target acceleration $\alpha\_t$ to the travel control device 6 as a command value for travel control of the host vehicle. As described above, when the self-driving switch 1 is in the on-state, the self-driving controller 20 outputs a command for the travel of the host vehicle to the travel control device 6, and the travel control device 6 controls actuators such as the throttle valve based on this command.

However, the travel control device 6 and/or the self-driving controller 20 may be programmed so that even when the self-driving switch 1 is in the on-state, when an operation of the accelerator pedal or the brake pedal by the driver is detected, the control of the actuators based on the operation by the driver is given priority to the self-driving control by the self-driving controller 20.

In particular, in a vehicle control method of this embodiment, the self-driving controller 20 has two control modes, i.e. basic driving control that is performed according to a normal self-driving control logic, and in-traffic-jam control that is performed when a traffic jam is detected.

In particular, the basic driving control is control that makes it a base to automatically adjust the travel (particularly the acceleration) of the host vehicle in terms of suppressing a rear-end collision with a preceding vehicle and cutting in line by another vehicle. In the basic driving control, the self-driving controller 20 calculates a target acceleration $\alpha\_t$ of the host vehicle to adjust the vehicle speed difference $\Delta Vs$ (=Vs_a−Vs_s) so that the intervehicle distance Dv approaches (is maintained at) a predetermined target intervehicle distance Dv_t.

When a preceding vehicle is not detected for a reason that there is no preceding vehicle in a detectable range of the peripheral information detector 3, or the like, the self-driving controller 20, for example, sets a legal speed as a target vehicle speed and calculates a target acceleration $\alpha\_t$ so that the vehicle speed Vs_s of the host vehicle approaches the target vehicle speed.

In the in-traffic-jam driving control, the self-driving controller 20 outputs to the travel control device 6 a command for giving to the host vehicle a relatively low drive torque compared to a drive torque that is determined based on the basic driving control. In particular, in this embodiment, a command for giving to the host vehicle, as this relatively low drive torque, a so-called creep torque as a driving force is output to the travel control device 6. Therefore, during the traffic jam, the host vehicle travels at a creep vehicle speed (e.g. several km/h) that can be realized by the creep torque. As will be described in detail later, in this embodiment, the self-driving controller 20 performs switching to the basic driving control when the intervehicle distance Dv satisfies a predetermined condition in the in-traffic-jam driving control.

Further, the self-driving controller 20 is formed by a microcomputer including a central processing unit (CPU), a read-only memory (ROM), a random access memory (RAM), and an input/output interface (I/O interface). The self-driving controller 20 may be formed by a single microcomputer or may be formed by a plurality of microcomputers.

The self-driving controller 20 is programmed to be able to perform the steps (the steps illustrated in FIGS. 2, 3, and 6) in the vehicle control method of this embodiment. The vehicle control method of this embodiment performed by the self-driving controller 20 will be described in more detail below.

Figure 2:
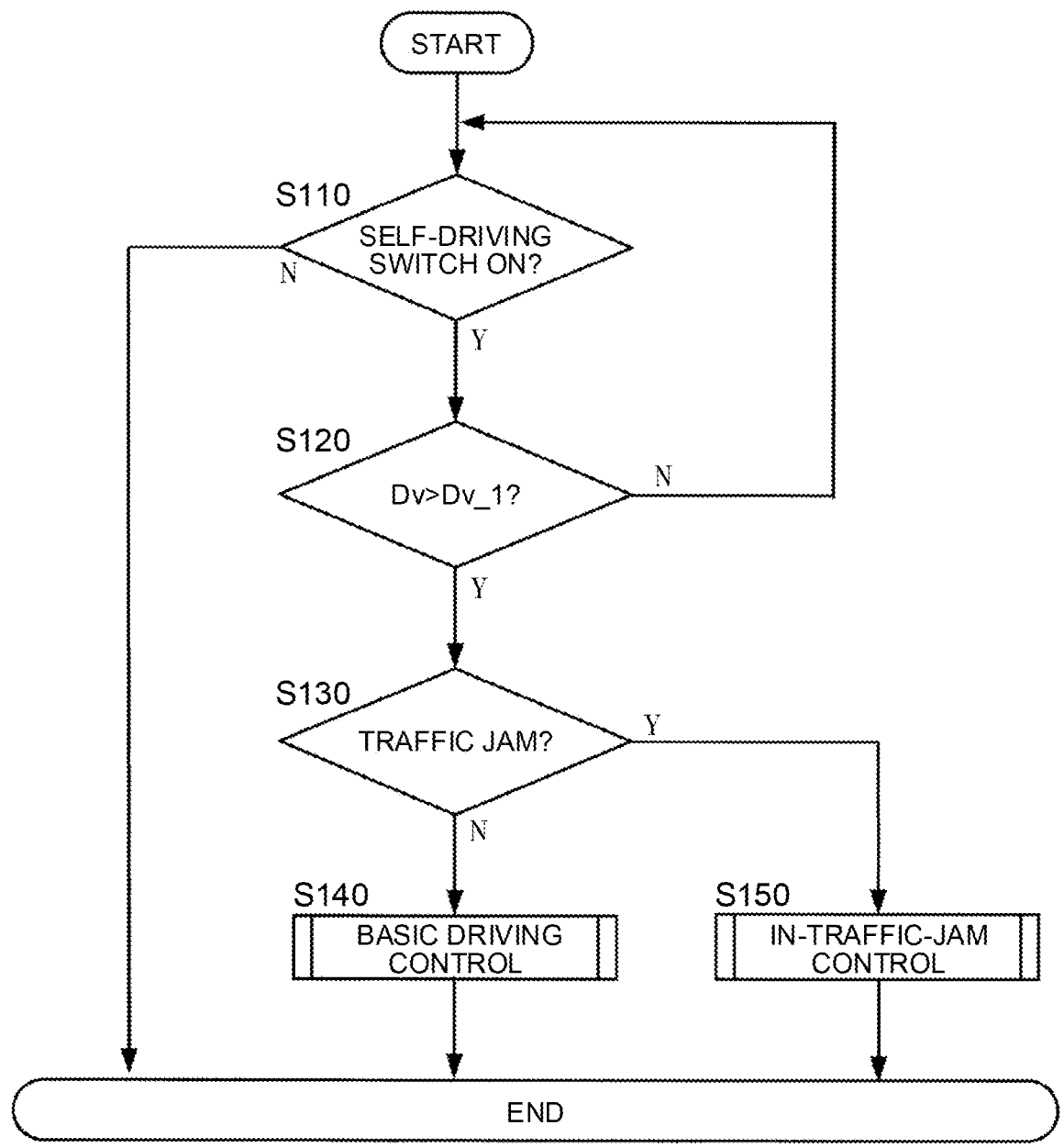
FIG. 2 is a flowchart for explaining the flow of a vehicle control method according to this embodiment.

FIG. 2 is a flowchart for explaining the flow of the vehicle control method according to this embodiment. The steps described below are repeatedly performed at a predetermined calculation cycle.

At step S110, the self-driving controller 20 determines whether or not the self-driving switch 1 is on. When the self-driving controller 20 determines that the self-driving switch 1 is not on, the self-driving controller 20 ends this routine. On the other hand, when the self-driving controller 20 determines that the self-driving switch 1 is on, the self-driving controller 20 performs the process of step S120.

At step S120, the self-driving controller 20 determines whether or not the intervehicle distance Dv between a preceding vehicle, traveling ahead on a travel lane on which the host vehicle is traveling, and the host vehicle is larger than a predetermined set during-vehicle-stop intervehicle distance Dv_1.

The set during-vehicle-stop intervehicle distance Dv_1 is a reference value of the intervehicle distance Dv that should be ensured with respect to the preceding vehicle even in the state where the host vehicle is stopped, in the self-driving control in this embodiment. Therefore, basically, the self-driving controller 20 calculates a target acceleration $\alpha\_t$ ($>0$) to start the host vehicle when the intervehicle distance Dv exceeds the set during-vehicle-stop intervehicle distance Dv_1 in the case where the host vehicle is stopped (in the case of Vs_s=0). On the other hand, the self-driving controller 20 calculates a target acceleration $\alpha\_t$ ($<0$) to stop the host vehicle when the intervehicle distance Dv becomes equal to or less than the set during-vehicle-stop intervehicle distance Dv_1 in the case where the host vehicle is traveling (vehicle speed Vs_s>0).

The set during-vehicle-stop intervehicle distance Dv_1 can be set to a magnitude such that, for example, even in the state where the preceding vehicle cannot travel due to a failure or the like, it is possible to avoid the preceding vehicle by steering the host vehicle while moving it forward (e.g. the magnitude corresponding to the length of one to one and half vehicles with the average full length).

When the self-driving controller 20 determines at step S120 that the intervehicle distance Dv is equal to or less than the set during-vehicle-stop intervehicle distance Dv_1, the self-driving controller 20 returns to step S110.

In this case, since the host vehicle is close to the preceding vehicle, it is conceivable that the driver performs a brake operation to stop the host vehicle. However, in terms of further improving the safety, it may be configured that when a brake operation of the driver is not detected, the self-driving controller 20 commands the brake controller 6B to perform a brake operation.

On the other hand, when the self-driving controller 20 determines that the intervehicle distance Dv is larger than the set during-vehicle-stop intervehicle distance Dv_1, the self-driving controller 20 proceeds to step S130.

At step S130, the self-driving controller 20 determines whether or not the travel lane is jammed. When the self-driving controller 20 determines that the travel lane is not jammed, the self-driving controller 20 shifts to the basic driving control of step S140. On the other hand, when the self-driving controller 20 determines that the travel lane is jammed, the self-driving controller 20 shifts to the in-traffic-jam driving control of step S150.

That is, in this embodiment, the self-driving controller 20 performs the basic driving control or the in-traffic-jam driving control according to the presence/absence of the traffic jam on the travel lane. First, the basic driving control will be described.

Figure 3:
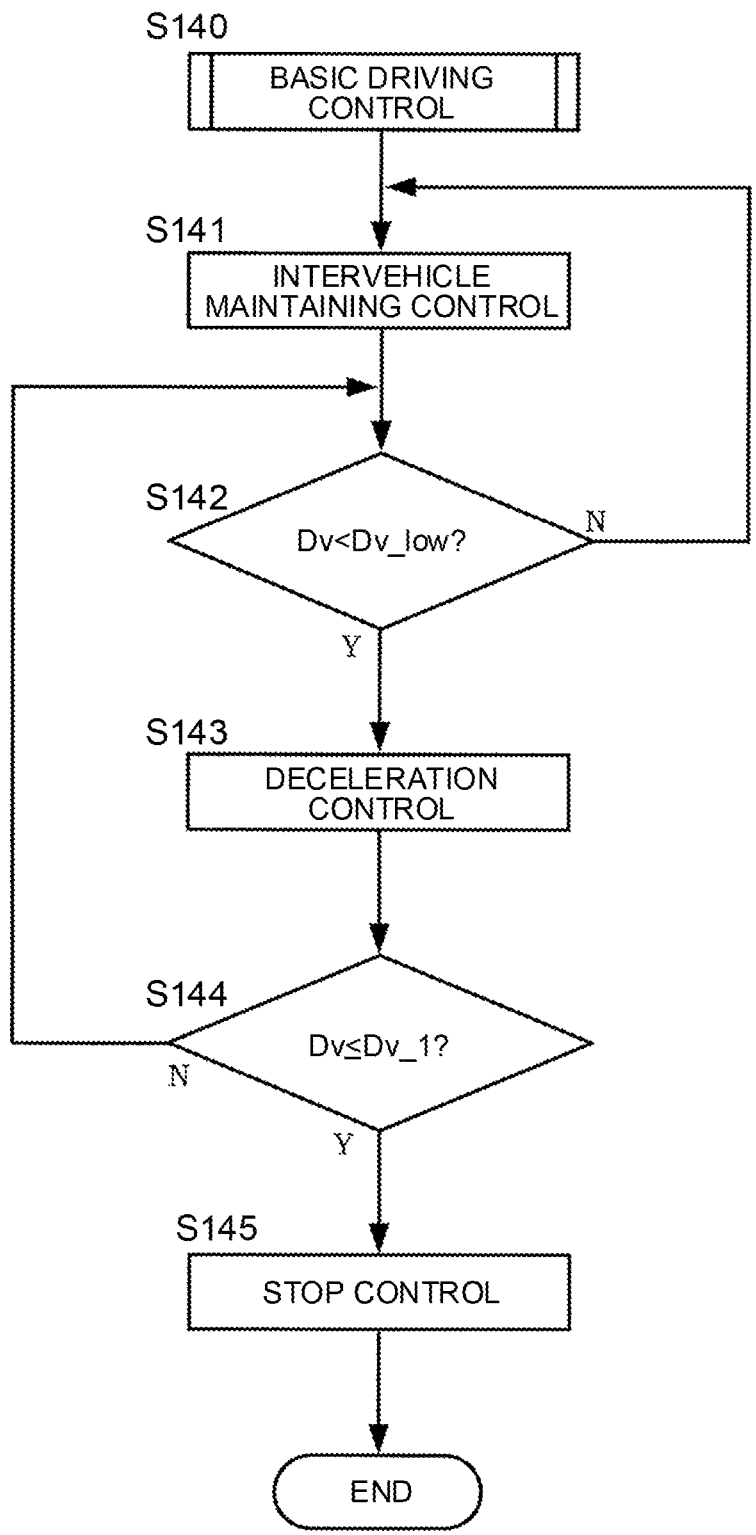
FIG. 3 is a flowchart for explaining the flow of basic driving control.

FIG. 3 is a flowchart for explaining the flow of the basic driving control.

As illustrated, the self-driving controller 20 performs intervehicle maintaining control at step S141.

Figure 4:
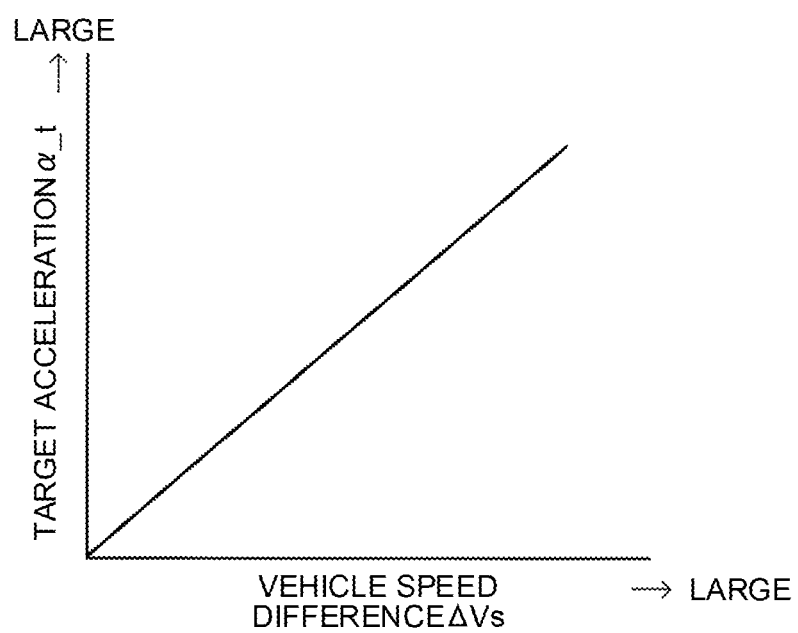
FIG. 4 is a map for explaining the relationship between control parameters that are set in intervehicle maintaining control.

FIG. 4 is a map for explaining the relationship between control parameters that are set in the intervehicle maintaining control.

As illustrated, in the intervehicle maintaining control, the self-driving controller 20 sets the target acceleration $\alpha\_t$ to be larger as the vehicle speed difference $\Delta Vs$ (Vs_a−Vs_s) becomes larger. That is, the self-driving controller 20 sets the target acceleration $\alpha\_t$ so that the intervehicle distance Dv approaches the preset target intervehicle distance Dv_t described above. In particular, when the intervehicle distance Dv becomes equal to the target intervehicle distance Dv_t, the target acceleration $\alpha\_t$ is set in such a way as to make the vehicle speed difference $\Delta Vs$ zero for maintaining this state.

Referring back to FIG. 3, at step S142, the self-driving controller 20 determines whether or not the intervehicle distance Dv is less than a preset deceleration control threshold value Dv_low.

Herein, the deceleration control threshold value Dv_low is a reference value for determining whether or not to reduce the vehicle speed Vs_s of the host vehicle to less than a value determined in the intervehicle maintaining control, in order to ensure an appropriate intervehicle distance Dv during traveling in terms of suppressing that the host vehicle reaches the preceding vehicle and that rapid deceleration occurs when stopping the host vehicle.

The deceleration control threshold value Dv_low is a value that is set to be larger as the vehicle speed Vs_s increases (see a solid line graph in FIG. 5 described later). This is for more reliably ensuring a braking distance that can prevent the host vehicle from reaching the preceding vehicle without rapid deceleration even in the case where, for example, the preceding vehicle is suddenly stopped (the case where the vehicle speed Vs_a of the preceding vehicle becomes zero in a short time).

Since, as described above, the deceleration control threshold value Dv_low is the reference value of the intervehicle distance Dv for determining whether or not to decelerate the host vehicle, the deceleration control threshold value Dv_low is set to a value larger than the set during-vehicle-stop intervehicle distance Dv_1 as the reference value for stopping the host vehicle.

When the self-driving controller 20 determines that the intervehicle distance Dv is equal to or larger than the deceleration control threshold value Dv_low (No at step S142), the self-driving controller 20 returns to step S141 and continues the intervehicle maintaining control. On the other hand, when the self-driving controller 20 determines that the intervehicle distance Dv is less than the deceleration control threshold value Dv_low (Yes at step S142), the self-driving controller 20 performs the process of step S143.

At step S143, the self-driving controller 20 performs deceleration control. In the deceleration control, in terms of preventing the intervehicle distance Dv from increasing, the target acceleration $\alpha\_t$ is set so as to cause the vehicle speed Vs_s to be a value (higher than the creep vehicle speed) that is lower than a value determined in the intervehicle maintaining control. Therefore, when the detected vehicle speed Vs_s is a value set in the intervehicle maintaining control or a value close thereto, the self-driving controller 20 calculates a target acceleration $\alpha\_t$ as a negative value.

The target acceleration $\alpha\_t$ in the deceleration control can be set to an arbitrary value taking into account that the current vehicle speed Vs_s of the host vehicle becomes a value lower than a vehicle speed set in the intervehicle maintaining control. However, in terms of properly suppressing both the host vehicle reaching the preceding vehicle and the rapid deceleration, the target acceleration $\alpha\_t$ may be set so that the absolute value thereof becomes equal to or less than a predetermined value. In terms of smoothly stopping the host vehicle in later-described stop control, the target acceleration $\alpha\_t$ in the deceleration control may be calculated so that the vehicle speed Vs_s becomes zero when the intervehicle distance Dv has reached the set during-vehicle-stop intervehicle distance Dv_1.

Then, at step S144, the self-driving controller 20 determines whether or not the intervehicle distance Dv is equal to or less than the set during-vehicle-stop intervehicle distance Dv_1. That is, the self-driving controller 20 determines whether or not the intervehicle distance Dv is narrowed in the deceleration control to a degree that makes it possible to determine that the host vehicle should be stopped.

When the self-driving controller 20 determines that the intervehicle distance Dv is not equal to or less than the set during-vehicle-stop intervehicle distance Dv_1, the self-driving controller 20 returns to step S142. On the other hand, when the self-driving controller 20 determines that the intervehicle distance Dv is equal to or less than the set during-vehicle-stop intervehicle distance Dv_1, the self-driving controller 20 performs the stop control of step S145.

At step S145, the self-driving controller 20 performs the stop control to stop the host vehicle. Specifically, the self-driving controller 20 sets a target acceleration $\alpha\_t$ (<0) according to a current vehicle speed Vs_s in such a way as to stop the host vehicle (vehicle speed Vs_s=0) as quickly as possible in a range with no hard braking.

Figure 5:
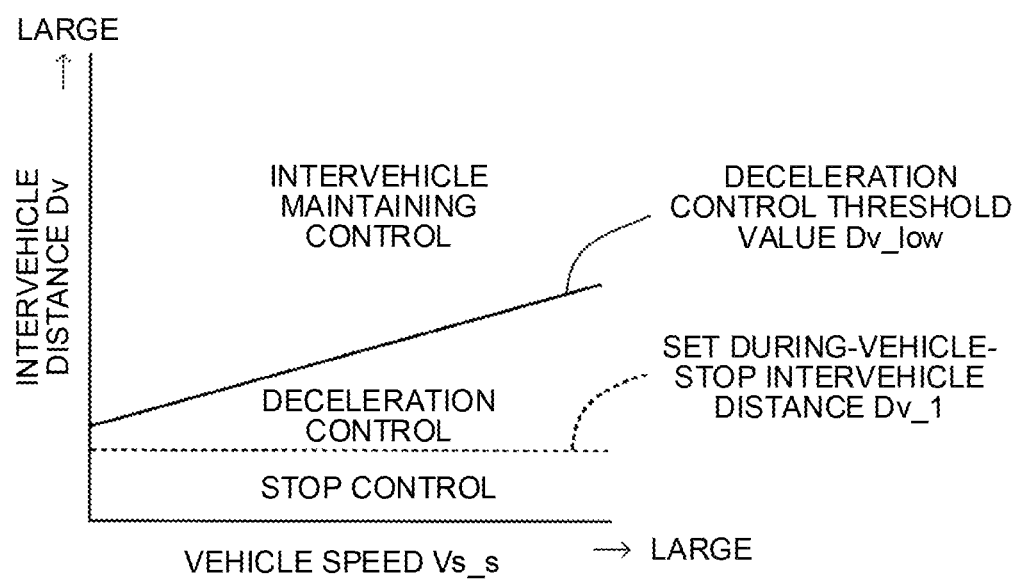
FIG. 5 is a diagram for explaining control modes of a host vehicle that are determined according to an intervehicle distance Dv in the basic driving control.

FIG. 5 is a diagram for explaining control modes of the host vehicle that are determined according to the intervehicle distance Dv in the basic driving control.

As illustrated, in the basic driving control described at steps S141 to S145, the intervehicle maintaining control (step S141) is performed in a region where the intervehicle distance Dv is larger than the deceleration control threshold value Dv_low, the deceleration control (step S143) is performed in a region where the intervehicle distance Dv is equal to or less than the deceleration control threshold value Dv_low and larger than the set during-vehicle-stop intervehicle distance Dv_1, and the stop control (step S145) is performed in a region where the intervehicle distance Dv is equal to or less than the set during-vehicle-stop intervehicle distance Dv_1.

Referring back to FIG. 2, as described above, when the self-driving controller 20 determines at step S130 that the travel lane is jammed, the self-driving controller 20 shifts to the in-traffic-jam driving control of step S150.

Figure 6:
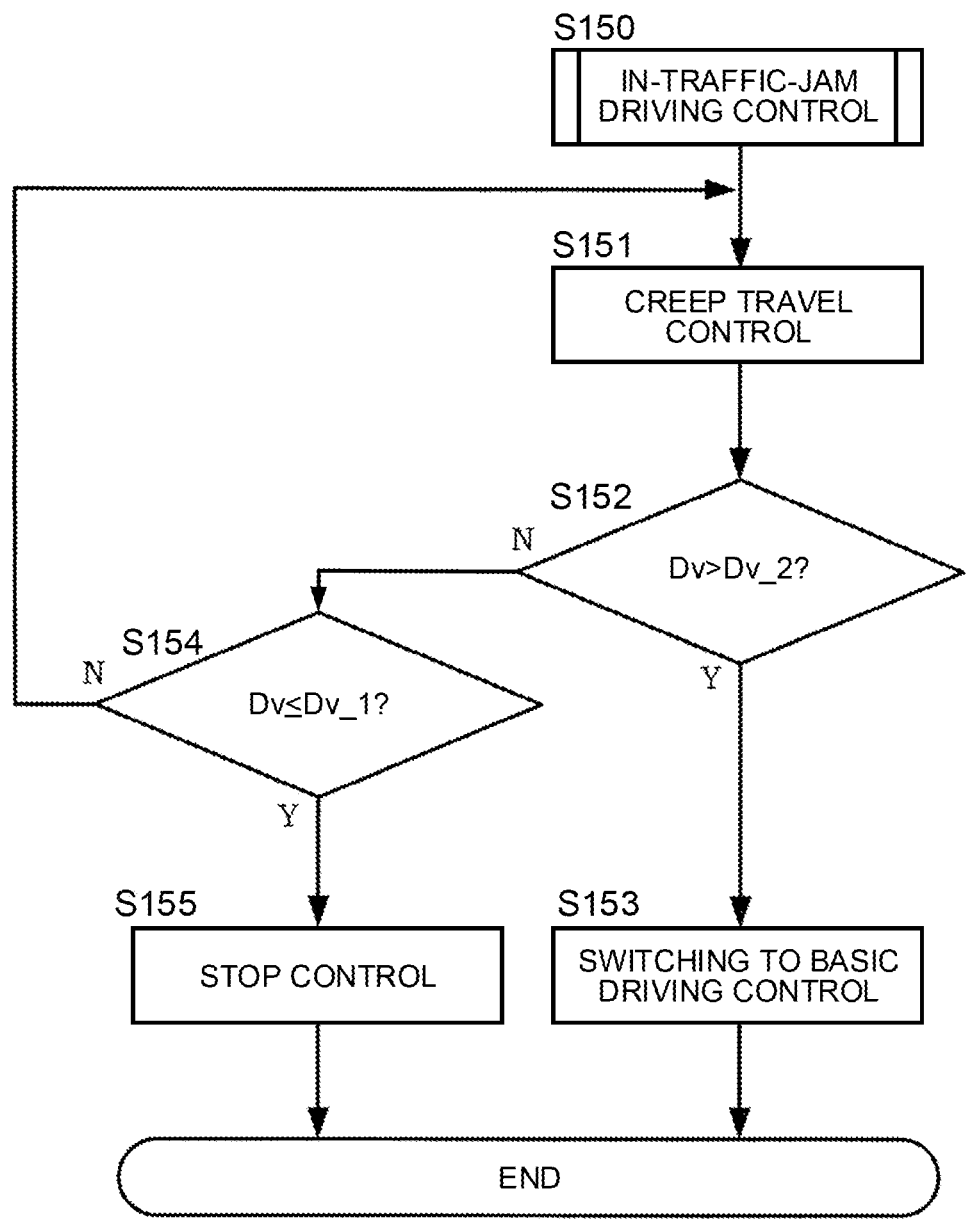
FIG. 6 is a flowchart for explaining the flow of in-traffic-jam driving control.

FIG. 6 is a flowchart for explaining the flow of the in-traffic-jam driving control.

As illustrated, at step S151, the self-driving controller 20 performs low torque travel control. Herein, the low torque travel control in this specification is control that drives the host vehicle by a drive torque lower than a drive torque corresponding to a target acceleration $\alpha\_t$ that is set in the intervehicle maintaining control of the basic driving control. That is, in the low torque travel control, since the travel of the host vehicle is controlled at a lower output compared to the basic driving control that causes the host vehicle to follow the preceding vehicle based on the intervehicle distance Dv, fuel economy becomes higher compared to during the travel of the host vehicle based on the basic driving control.

In particular, in this embodiment, so-called creep travel control that causes the host vehicle to travel by the creep torque being the torque that is generated by the engine as the drive source in an idling state is performed as the low torque travel control. That is, the self-driving controller 20 commands the travel control device 6 to drive the host vehicle by the creep torque.

In the creep travel control, since the host vehicle is driven by the creep torque that can be inevitably generated in the idling state of the engine, the fuel consumption amount approximately corresponds to the fuel consumption amount in the idling state of the engine. Therefore, the fuel consumption amount in the creep travel control becomes smaller than the fuel consumption amount in the basic driving control.

Herein, assuming that the basic driving control, not the creep travel control, is performed even in the traffic jam, it is conceivable that, for example, even when the host vehicle is started after the preceding vehicle is started from the stop states of the preceding vehicle and the host vehicle so that the intervehicle distance Dv exceeds the set during-vehicle-stop intervehicle distance Dv_1, the preceding vehicle is stopped in a short time due to the traffic jam so that the intervehicle distance Dv becomes equal to or less than the set during-vehicle-stop intervehicle distance Dv_1 again, and consequently, the host vehicle is stopped (steps S144 and S145 in FIG. 3). Therefore, the start and the stop of the host vehicle are repeated, leading to a possibility of degradation of fuel economy.

Therefore, in this embodiment, when it is determined that the travel lane of the host vehicle is jammed, the in-traffic-jam driving control is performed to perform the creep travel control. Consequently, even when the host vehicle is started following the start of the preceding vehicle, it is possible to follow the preceding vehicle at the creep vehicle speed while suppressing the fuel consumption amount by the travel of the host vehicle to the amount corresponding to the fuel consumption amount in the idling state.

In particular, during the traffic jam, a scene is conceivable in which the preceding vehicle travels at a relatively low speed even after the start thereof. Therefore, compared to during a non-traffic jam, it is possible to obtain a certain effect that even when the host vehicle travels at the creep vehicle speed, the host vehicle follows the preceding vehicle to suppress an excessive increase in the intervehicle distance Dv. That is, in this embodiment, in the traffic jam, it is possible to reduce the fuel consumption while maintaining the effect of suppressing the increase in the intervehicle distance Dv by performing the creep travel control.

On the other hand, since the creep vehicle speed is generated by the creep torque of the degree that is obtained in the idling state of the engine, the creep vehicle speed is a low value of about several km. Further, even in the traffic jam, it is conceivable that the intervehicle distance between the preceding vehicle and a vehicle traveling further ahead of the preceding vehicle increases according to the situation of the travel lane so that the vehicle speed Vs_a of the preceding vehicle increases to some extent.

When the creep travel control is continued in such a scene, the vehicle speed difference ΔVs increases to increase the intervehicle distance Dv. Consequently, for example, a space for another vehicle traveling on the adjacent lane to cut in line tends to be formed between the host vehicle and the preceding vehicle.

The self-driving controller 20 of this embodiment performs the processes of step S152 and subsequent steps in terms of suppressing such cutting in line.

Specifically, at step S152, the self-driving controller 20 determines whether or not the intervehicle distance Dv is larger than a creep travel intervehicle upper limit distance Dv_2 as a predetermined upper limit distance.

Herein, the creep travel intervehicle upper limit distance Dv_2 is a value that is set as a reference for determining whether or not the intervehicle distance Dv is increased to a degree that provokes another vehicle to cut in line between the preceding vehicle and the host vehicle in the creep travel control. That is, the creep travel intervehicle upper limit distance Dv_2 is set to a value of a degree that is expected to obtain an effect of suppressing cutting in line by another vehicle if the intervehicle distance Dv is equal to or less than the creep travel intervehicle upper limit distance Dv_2. As the creep travel intervehicle upper limit distance Dv_2, it is possible to use a value that is experimentally or empirically determined in advance.

For example, the creep travel intervehicle upper limit distance Dv_2 can be set to about three times the average vehicle full length. In particular, by setting the creep travel intervehicle upper limit distance Dv_2 to about three times a light vehicle with a relatively short full length (e.g. a vehicle with a full length equal to or less than 3.4 m), it is possible to exhibit a cutting-in-line suppression effect that does not depend on the type of another vehicle.

On the other hand, the creep travel control is performed on the premise that the intervehicle distance Dv is larger than the set during-vehicle-stop intervehicle distance Dv_1 at which the host vehicle should be stopped. Therefore, the creep travel intervehicle upper limit distance Dv_2 is set to a value larger than at least the set during-vehicle-stop intervehicle distance Dv_1.

When the self-driving controller 20 determines at step S152 that the intervehicle distance Dv is larger than the creep travel intervehicle upper limit distance Dv_2, the self-driving controller 20 proceeds to step S153.

At step S153, the self-driving controller 20 switches the in-traffic-jam driving control to the basic driving control. That is, when the intervehicle distance Dv exceeds the creep travel intervehicle upper limit distance Dv_2, the self-driving controller 20 ends the creep travel control and shifts to the intervehicle maintaining control (step S141 in FIG. 3).

More specifically, when the intervehicle distance Dv is larger than the creep travel intervehicle upper limit distance Dv_2, a space between the preceding vehicle and the host vehicle is increased so that there is a possibility of provoking cutting in line by another vehicle into the space. On the other hand, with the control of this embodiment, when the intervehicle distance Dv exceeds the creep travel intervehicle upper limit distance Dv_2, the creep travel control is switched to the intervehicle maintaining control (step S141), and therefore, it is possible to suppress cutting in line by another vehicle.

When it is set that the creep travel intervehicle upper limit distance Dv_2>the deceleration control threshold value Dv_low, the result of determination performed at step S142 via the intervehicle maintaining control (step S141 in FIG. 3) after determination of Dv>Dv_2 to shift from the in-traffic-jam driving control to the basic driving control becomes negative (Dv≥Dv_low). As a result, the self-driving controller 20 maintains the intervehicle maintaining control (step S141) at least for a certain period of time.

On the other hand, when it is set that the creep travel intervehicle upper limit distance Dv_2≤the deceleration control threshold value Dv_low, the result of determination performed at step S142 via the intervehicle maintaining control (step S141 in FIG. 3) after determination of Dv>Dv_2 to shift from the in-traffic-jam driving control to the basic driving control becomes negative (Dv≥Dv_low). As a result, the self-driving controller 20 performs the creep travel control substantially immediately after the shift to the basic driving control.

However, in either of the cases, the host vehicle is controlled at a vehicle speed Vs_s higher than the creep vehicle speed in the creep travel control, and therefore, it is possible to suppress an excessive increase in the intervehicle distance Dv to thereby suppress cutting in line by another vehicle.

On the other hand, when the self-driving controller 20 determines at step S152 that the intervehicle distance Dv is equal to or less than the creep travel intervehicle upper limit distance Dv_2, the self-driving controller 20 performs the process of step S154 for determination as to whether to stop the host vehicle or to continue the creep travel control, and subsequent steps.

Specifically, at step S154, the self-driving controller 20 determines whether or not the intervehicle distance Dv is equal to or less than the set during-vehicle-stop intervehicle distance Dv_1.

When the self-driving controller 20 determines that the intervehicle distance Dv is not equal to or less than the set during-vehicle-stop intervehicle distance Dv_1, the self-driving controller 20 continues the creep travel control. On the other hand, when the self-driving controller 20 determines that the intervehicle distance Dv is equal to or less than the set during-vehicle-stop intervehicle distance Dv_1, the self-driving controller 20 performs stop control of step S155.

That is, it is conceivable that in the state where the host vehicle travels by the creep travel control, the preceding vehicle is stopped or the like due to the traffic jam so that the intervehicle distance Dv is narrowed. In order to cope with such a scene, like in the case of the stop control (step S145 in FIG. 3) described in the basic driving control, the self-driving controller 20 of this embodiment performs control to stop the host vehicle when the intervehicle distance Dv becomes equal to or less than the set during-vehicle-stop intervehicle distance Dv_1 at which the host vehicle should be stopped.

Next, the operations and effects in the vehicle control method of this embodiment described above will be described in comparison with Comparative Examples.

Figure 7:
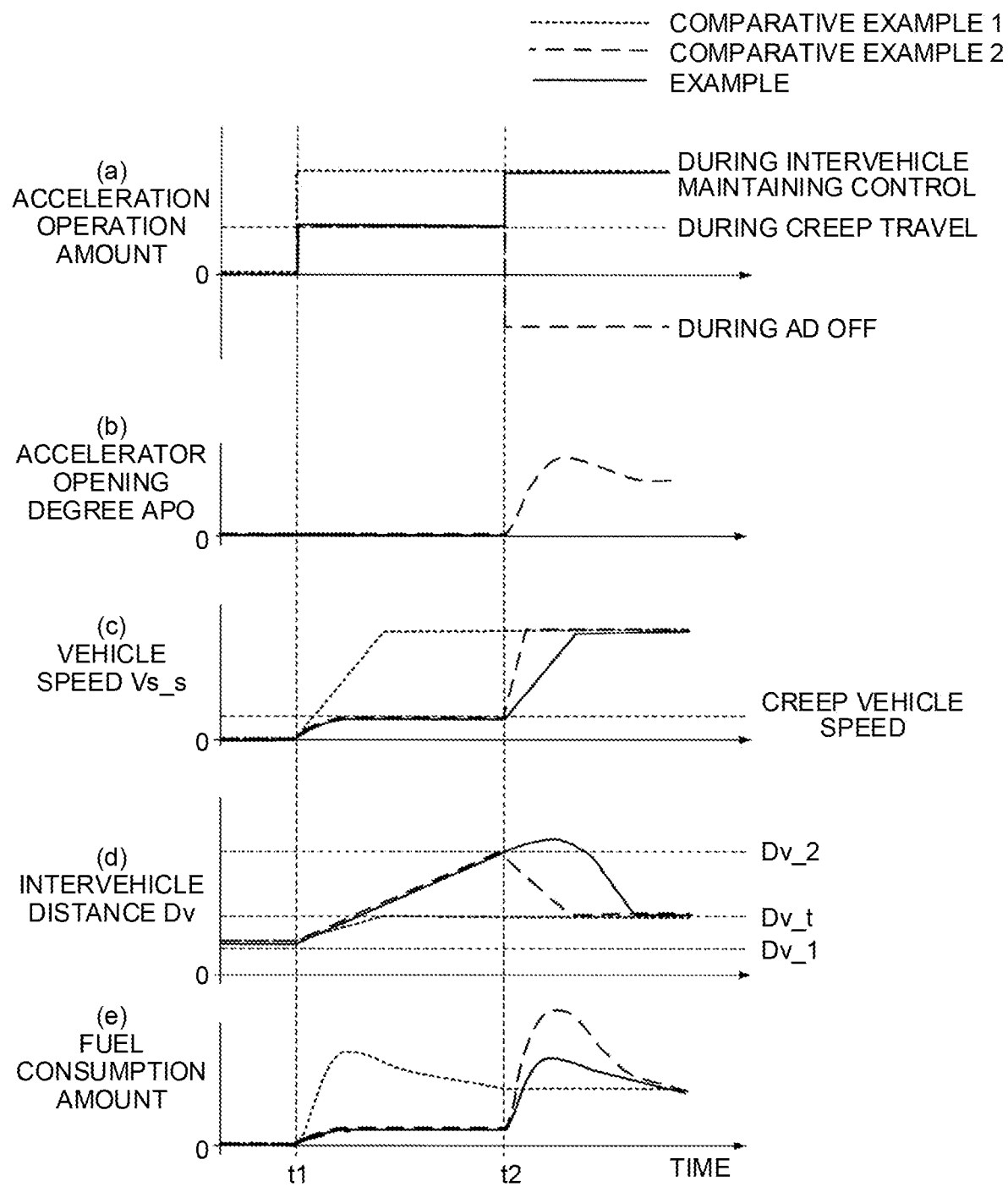
FIG. 7 is a timing chart for explaining temporal changes of parameters in the in-traffic-jam driving control of this Example and controls of Comparative Examples.

FIG. 7 is a timing chart for explaining temporal changes of parameters relating to the travel of the host vehicle by a control mode based on the in-traffic-jam driving control (see FIG. 6) of this embodiment (hereinafter also referred to simply as an "Example") and controls of the Comparative Examples.

Herein, Comparative Example 1 illustrated in the figure is an example that controls the travel of the host vehicle according to the logic of the basic driving control without performing the creep travel control even in a traffic jam. Comparative Example 2 is an example that controls the travel of the host vehicle in a mode that performs the creep travel control in a traffic jam, but does not perform the switching process from the creep travel control to the basic driving control (the process of step S153 in FIG. 6).

FIG. 7(a) illustrates the changes of the operation amount to the actuator (injector, hydraulic brake, etc.) (hereinafter also referred to as the "acceleration operation amount") by the travel control device 6 (FIG. 1) based on a target acceleration $\alpha\_t$ calculated by the self-driving controller 20.

FIG. 7(b) illustrates the changes of the accelerator opening degree APO corresponding to an accelerator operation of the driver. FIG. 7(c) illustrates the changes of the vehicle speed $Vs\_s$ of the host vehicle. FIG. 7(d) illustrates the changes of the intervehicle distance Dv. FIG. 7(e) illustrates the changes of the fuel consumption amount.

In FIGS. 7(a) to 7(e), the changes of the acceleration operation amount and the vehicle speed $Vs\_s$ are assumed to be constant or linear for the simplicity of drawing and description.

Further, in FIGS. 7(a) to 7(e), the temporal changes of the parameters of the host vehicle by the control of the Example are indicated by solid line graphs. The temporal changes of the parameters of the host vehicle by the control of Comparative Example 1 are indicated by dotted line graphs. The temporal changes of the parameters of the host vehicle by the control of Comparative Example 2 are indicated by broken line graphs.

Comparative Example 1

First, when the intervehicle distance Dv exceeds the set during-vehicle-stop intervehicle distance $Dv\_1$ due to the start of the preceding vehicle or the like at time t1, the intervehicle maintaining control (the control of step S141 in FIG. 3) based on the basic driving control is performed. In Comparative Example 1, since the creep travel control is not selected even in the traffic jam, the intervehicle maintaining control is basically maintained after the start of the host vehicle.

That is, in Comparative Example 1, the acceleration operation amount larger than the acceleration operation amount corresponding to the creep torque is set according to the intervehicle maintaining control even in the traffic jam (dotted line in FIG. 7(a)). Therefore, the vehicle speed $Vs\_s$ can be increased to a desired value relatively fast (dotted line in FIG. 7(c)) so that the intervehicle distance Dv can reach the target intervehicle distance $Dv\_t$ quickly (dotted line in FIG. 7(d)).

However, in the case of Comparative Example 1, since the acceleration operation amount is set to be large, the fuel consumption amount also becomes relatively large (dotted line in FIG. 7(e)). In particular, the fuel consumption amount for required torque immediately after the start (around time t1) is large. Further, as described above, in the traffic jam, with the intervehicle maintaining control that controls the travel of the host vehicle based on the intervehicle distance Dv, the start and the stop of the host vehicle are repeated according to the repetition of the start and the stop of the preceding vehicle. Therefore, with the control of Comparative Example 1, the control particularly immediately after the start where the fuel consumption amount becomes relatively large is repeated so that the fuel economy is degraded.

Comparative Example 2

The creep travel control is performed at time t1. That is, the acceleration operation amount is set to the magnitude corresponding to the creep torque (broken line in FIG. 7(a)). Therefore, the vehicle speed $Vs\_s$ is controlled at the creep vehicle speed (broken line in FIG. 7(c)). Accordingly, when the preceding vehicle is traveling at a vehicle speed $Vs\_a$ exceeding the creep vehicle speed, the intervehicle distance Dv increases with time (broken line in FIG. 7(d)).

Further, after time t2 at which the intervehicle distance Dv exceeds the creep travel intervehicle upper limit distance $Dv\_2$, the intervehicle distance Dv increases to a degree that provokes cutting in line by another vehicle (broken line in FIG. 7(d)). Therefore, it is conceivable that an accelerator operation is performed by the driver to shorten the intervehicle distance Dv. With an increase in the accelerator opening degree APO by the accelerator operation of the driver (broken line in FIG. 7(b)), the vehicle speed $Vs\_s$ increases (broken line in FIG. 7(c)).

In this event, it is conceivable that, in terms of narrowing the intervehicle distance Dv as quickly as possible, the driver may perform an accelerator operation that provides an acceleration higher than a target acceleration $\alpha\_t$ that is set according to the intervehicle maintaining control based on the basic driving control. Accordingly, after time t2, the fuel consumption amount until the intervehicle distance Dv reaches the target intervehicle distance $Dv\_t$ becomes large (broken line in FIG. 7(d)), and therefore, there is concern about the degradation of fuel economy.

On the other hand, in the control of Comparative Example 2, in the case where the driver does not perform an accelerator operation even after time t2 at which the intervehicle distance Dv exceeds the creep travel intervehicle upper limit distance $Dv\_2$, the creep vehicle speed is maintained according to the creep travel control also after time t2.

As a result, when the preceding vehicle is traveling at the vehicle speed $Vs\_a$ exceeding the creep vehicle speed, the vehicle speed difference $\Delta Vs$ becomes larger than a desired value for causing the intervehicle distance Dv to approach the target intervehicle distance $Dv\_t$ so that the intervehicle distance Dv continues to increase. Therefore, in this case, the interval between the preceding vehicle and the host vehicle increases to provoke cutting in line by another vehicle.

Example

The control during the traffic jam in the vehicle control method according to this Example conforms to the control logic described in FIGS. 2, 3, and 6. Therefore, at time t1, when the intervehicle distance Dv exceeds the set during-vehicle-stop intervehicle distance $Dv\_1$, the traffic jam is detected so that, like in the case of Comparative Example 2, the creep travel control is performed (Yes at step S130 in FIG. 2 and step S151 in FIG. 6).

On the other hand, this Example differs from Comparative Example 2 in that when the intervehicle distance Dv exceeds the creep travel intervehicle upper limit distance $Dv\_2$ (Yes at step S152) at time t2, the in-traffic-jam driving control is switched to the basic driving control according to the logic of step S153.

Consequently, after time t2, the intervehicle maintaining control or the deceleration control is performed based on the basic driving control. In particular, in the intervehicle maintaining control, the acceleration operation amount is adjusted based on a target acceleration $\alpha\_t$ that is calculated in terms of properly controlling the vehicle speed Vs_s so that the intervehicle distance Dv reaches the target intervehicle distance Dv_t without rapid acceleration. Therefore, compared to the case where the acceleration operation amount corresponding to the accelerator operation of the driver is set after time t2 in Comparative Example 2, it is possible to reduce the fuel consumption amount (solid line in FIG. 7(*e*)).

Further, in this Example, in the intervehicle maintaining control or the deceleration control after time t2, the vehicle speed Vs_s of the host vehicle is basically set to be larger than the creep vehicle speed.

Therefore, compared to the case where the creep travel control is continued also after time t2, the intervehicle distance Dv can reach the target intervehicle distance Dv_t more quickly. That is, in this Example, even when the intervehicle distance Dv exceeds the creep travel intervehicle upper limit distance Dv_2, the intervehicle distance Dv is prevented from excessively increasing so that it is possible to suppress cutting in line by another vehicle. The effects of the vehicle control method in this Example will be described in further detail below.

Figure 8:
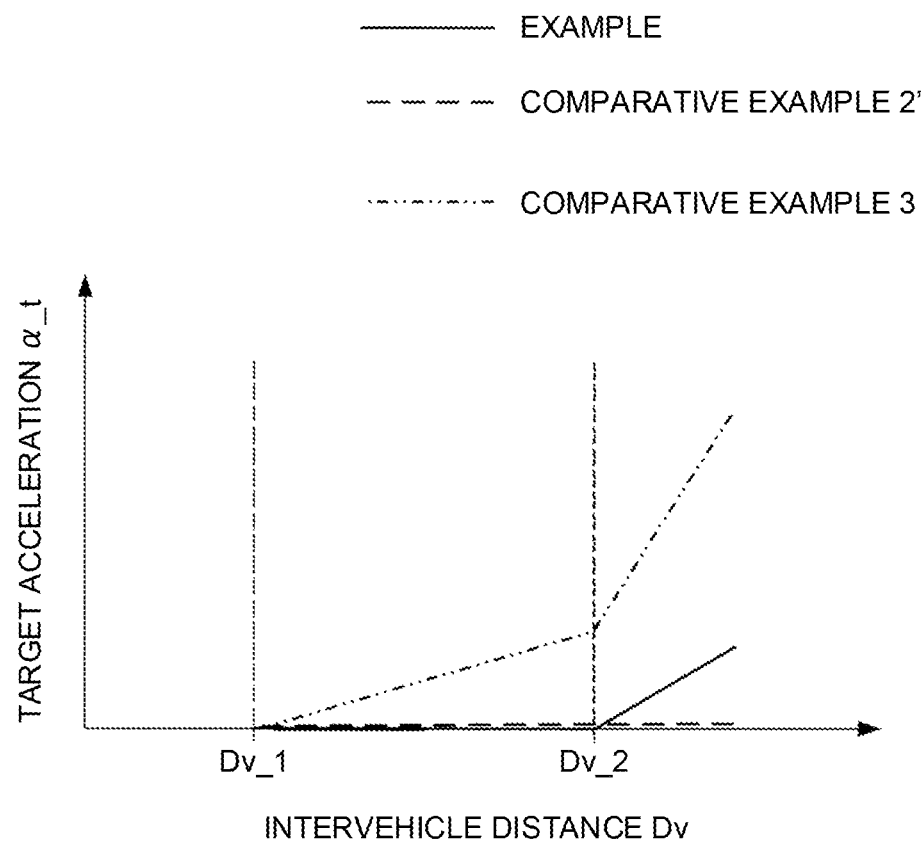
FIG. 8 is a diagram illustrating a comparison of the relationships between the intervehicle distance and the host vehicle acceleration in the control of this Example and controls of Comparative Examples.

FIG. 8 illustrates a comparison of the relationships between the intervehicle distance Dv and the target acceleration $\alpha\_t$ in the control of this Example and controls of Comparative Examples. In FIG. 8, a graph of the target acceleration $\alpha\_t$ when travel control (acceleration/deceleration) of the host vehicle is performed by only an accelerator operation of the driver (hereinafter referred to as "Comparative Example 3"), i.e. when the self-driving control including the basic driving control and the in-traffic-jam driving control is not performed, is indicated by a two-dot chain line.

Further, a graph of the target acceleration $\alpha\_t$ when the creep travel control is continued also after time t2 in Comparative Example 2 described in FIG. 7 (hereinafter referred to as "Comparative Example 2") is indicated by a broken line. Further, a graph of the target acceleration $\alpha\_t$ in the case of the vehicle control method in this Example is indicated by a solid line.

For the simplicity of drawing, the target acceleration $\alpha\_t$ in the creep travel control, including immediately after the start of the host vehicle, is assumed to be zero in each of the graphs.

As seen from the two-dot chain line graph in FIG. 8, when the travel control of the host vehicle is performed by the accelerator operation of the driver in a region where the intervehicle distance Dv is equal to or larger than the set during-vehicle-stop intervehicle distance Dv_1 and equal to or less than the creep travel intervehicle upper limit distance Dv_2, the target acceleration $\alpha\_t$ with a value corresponding to a magnitude of the intervehicle distance Dv is set.

This target acceleration $\alpha\_t$ is a value that is set based on the acceleration operation amount by the accelerator operation performed by the driver in terms of narrowing the intervehicle distance between the preceding vehicle and the host vehicle according to the intervehicle distance Dv. That is, this target acceleration $\alpha\_t$ generally serves as an index of the ease of cutting in line by another vehicle that is recognized by the driver. Herein, as already described, the creep travel intervehicle upper limit distance Dv_2 is a distance that is set in terms of effectively suppressing cutting in line by another vehicle. As also seen from the two-dot chain line graph in FIG. 8, the target acceleration $\alpha\_t$ indicative of the ease of cutting in line by another vehicle recognized by the driver significantly increases in a region exceeding the creep travel intervehicle upper limit distance Dv_2, but is relatively small in the region where the intervehicle distance Dv is equal to or less than the creep travel intervehicle upper limit distance Dv_2 (Dv_1≤Dv≤Dv_2). Therefore, even when the operation to narrow the intervehicle distance Dv is performed in the region of Dv_1≤Dv≤Dv_2, the merit obtained in terms of suppressing cutting in line is small. On the other hand, due to the acceleration operation amount by the accelerator operation of the driver, more fuel is consumed compared to the case of the creep travel.

That is, when the target acceleration $\alpha\_t$ corresponding to the accelerator operation of the driver is set in the region of Dv_1≤Dv≤Dv_2, the fuel consumption amount increases although the expectation to improve the cutting-in-line suppression effect is low.

On the other hand, with the control of Comparative Example 2' or the control of this Example, the host vehicle is controlled based on the creep travel control (target acceleration $\alpha\_t \approx 0$) in the region of Dv_1≤Dv≤Dv_2. Therefore, it is possible to suppress the fuel consumption compared to the case where the target acceleration at is set according to the accelerator operation of the driver.

Next, with the control of Comparative Example 2', in the region where the intervehicle distance Dv is larger than the creep travel intervehicle upper limit distance Dv_2 (Dv>Dv_2), the creep travel control is continued so that the state of target acceleration $\alpha\_t \approx 0$ is maintained. Therefore, the intervehicle distance Dv further tends to increase. In particular, with Dv>Dv_2, the difference between the target acceleration $\alpha\_t$ based on the control of Comparative Example 3 according to the accelerator operation of the average driver and the target acceleration $\alpha\_t$ based on the control of Comparative Example 2' increases to be equal to or larger than a certain value (see the two-dot chain line graph and the broken line graph in FIG. 8).

That is, with the control of Comparative Example 2', despite a situation where the intervehicle distance Dv increases to a degree that exceeds the creep travel intervehicle upper limit distance Dv_2 so that the driver is supposed to attempt to increase the accelerator operation amount to averagely narrow the intervehicle distance Dv (a situation of attempting to increase the vehicle speed Vs_s), the host vehicle is continuously controlled at the low creep vehicle speed. Therefore, that is a possibility that the intervehicle distance Dv further increases to provoke cutting in line by another vehicle between the preceding vehicle and the host vehicle.

On the other hand, with the control of this Example, when the intervehicle distance Dv exceeds the creep travel intervehicle upper limit distance Dv_2, the in-traffic-jam driving control is switched to the basic driving control and therefore the creep travel control is released so that the travel control of the host vehicle is performed based on the intervehicle maintaining control. Consequently, with the control of this Example, in the region of Dv>Dv_2, the target acceleration $\alpha\_t$ is calculated as a value (target acceleration $\alpha\_t$) corresponding to a magnitude of the intervehicle distance Dv as indicated by the solid line graph.

Therefore, while suppressing wasteful fuel consumption compared to the control of Comparative Example 3, it is possible to suppress an excessive increase in the intervehicle distance Dv that may provoke cutting in line, compared to the control of Comparative Example 2'.

With the vehicle control method of this embodiment described above, the following operations and effects are exhibited.

In this embodiment, there is provided the vehicle control method including the basic driving control (step S140) as basic self-driving control that automatically controls the travel (acceleration) of the host vehicle based on the intervehicle distance Dv between the host vehicle and the preceding vehicle.

In this vehicle control method, when a traffic jam on the travel lane of the host vehicle is detected (Yes at step S130 in FIG. 2), the creep travel control as the low torque travel control that causes the host vehicle to travel by a drive torque lower than a drive torque determined based on the basic self-driving control is performed (step S151 in FIG. 6), and when the intervehicle distance Dv exceeds, in the creep travel control, the creep travel intervehicle upper limit distance Dv_2 as a predetermined upper limit distance that serves as a reference for the start or the stop of the host vehicle in the basic self-driving control (Yes at step S152 in FIG. 6), the creep travel control is switched to the basic self-driving control (step S153 in FIG. 6).

That is, even when the host vehicle is traveling in the traffic jam in the creep travel control (when the vehicle speed Vs_s is the creep vehicle speed), the creep travel control can be switched to the basic self-driving control when the intervehicle distance Dv exceeds the creep travel intervehicle upper limit distance Dv_2 due to an increase in the vehicle speed difference ΔVs between the preceding vehicle and the host vehicle.

Consequently, it is possible to suppress an excessive increase in the intervehicle distance Dv that is caused by the continuation of the creep travel control even though the intervehicle distance Dv is increased to be equal to or larger than a certain value. As a result, it is possible to suppress cutting in line by another vehicle between the preceding vehicle and the host vehicle.

Specifically, the creep travel intervehicle upper limit distance Dv_2 is set to a magnitude that is determined in terms of suppressing cutting in line by another vehicle between the host vehicle and the preceding vehicle. For example, the creep travel intervehicle upper limit distance Dv_2 can be set to about three times a regular passenger car, which generally serves as a reference for a driver to determine that cutting in line between vehicles is enabled. Consequently, it is possible to more properly suppress cutting in line by another vehicle due to an increase in the intervehicle distance Dv.

Further, the creep travel intervehicle upper limit distance Dv_2 is set to be larger than the set during-vehicle-stop intervehicle distance Dv_1 that serves as a reference for the start or the stop of the host vehicle in the basic self-driving control. Consequently, the region of the intervehicle distance Dv where the creep travel control of the host vehicle is performed can be more reliably ensured in the range where the intervehicle distance Dv is larger than the set during-vehicle-stop intervehicle distance Dv_1 and equal to or less than the creep travel intervehicle upper limit distance Dv_2. Therefore, it is possible to more reliably perform the switching from the creep travel control to the basic self-driving control using the creep travel intervehicle upper limit distance Dv_2 as a reference.

With the vehicle control method in this embodiment, when the intervehicle distance Dv becomes equal to or less than the set during-vehicle-stop intervehicle distance Dv_1 in the creep travel control (No at step S152), the host vehicle is stopped. Consequently, also in the in-traffic-jam control (step S150) that is performed in a traffic jam, like in the case of the basic driving control, it is possible to stop the host vehicle when the intervehicle distance Dv has reached the set during-vehicle-stop intervehicle distance Dv_1 at which the host vehicle should be stopped.

As a result, in the creep travel control, when the vehicle speed of the preceding vehicle is lowered (or stopped), it is possible to prevent the host vehicle from reaching the preceding vehicle. In particular, in the creep travel control, the vehicle speed Vs_s of the host vehicle becomes the relatively low creep vehicle speed (several km/h). Therefore, also in the creep travel control (the in-traffic-jam driving control), when the intervehicle distance Dv becomes equal to or less than the set during-vehicle-stop intervehicle distance Dv_1 that is determined from the viewpoint that it should be ensured when the vehicle is stopped, it is possible to stop the host vehicle. That is, even in the control mode of switching between the basic driving control and the in-traffic-jam driving control according to the presence/absence of a traffic jam in this embodiment, it is possible to realize the control for properly stopping the host vehicle.

Further, according to this embodiment, there is provided the vehicle control system 10 (see FIG. 1), suitable for performing the above-described vehicle control method, that automatically controls the travel of the host vehicle based on the intervehicle distance Dv between the host vehicle and the preceding vehicle.

The vehicle control system 10 includes the peripheral information detector 3 as an intervehicle distance acquisition device that acquires an intervehicle distance Dv between the host vehicle and the preceding vehicle, the vehicle speed sensor 2 as a host vehicle speed acquisition device that acquires a vehicle speed Vs_s of the host vehicle, the peripheral information detector 3 as a vehicle speed difference acquisition device that acquires a vehicle speed difference ΔVs between the host vehicle and the preceding vehicle, the receiver 5 as a traffic jam information acquisition device that acquires traffic jam information indicating whether or not a travel lane of the host vehicle is jammed, and the self-driving controller 20 that controls the travel of the host vehicle based on the intervehicle distance Dv, the vehicle speed difference ΔVs, the vehicle speed Vs_a of the preceding vehicle, and the traffic jam information.

When the self-driving controller 20 determines that the intervehicle distance Dv is larger than the set during-vehicle-stop intervehicle distance Dv_1 serving as a reference for the start or the stop of the host vehicle (step S120 in FIG. 2), the self-driving controller 20 determines based on the traffic jam information whether or not the travel lane is jammed (step S130 in FIG. 2). When the self-driving controller 20 determines that the travel lane is not jammed (Yes at step S130 in FIG. 2), the self-driving controller 20 performs the basic self-driving control (step S140 in FIG. 3) including the intervehicle maintaining control (step S141 in FIG. 3) that maintains the intervehicle distance Dv in a predetermined range based on the vehicle speed difference ΔVs (=Vs_a−Vs_s) between the host vehicle and the preceding vehicle. When the self-driving controller 20 determines that the travel lane is jammed (No at step S130 in FIG. 2), the self-driving controller 20 performs the in-traffic-jam self-driving control (step S150 in FIG. 6) including the creep travel control (step S151 in FIG. 6) as the low torque travel control that causes the host vehicle to travel by a drive torque lower than a drive torque determined based on the basic self-driving control. When the intervehicle distance Dv exceeds, in the creep travel control, the creep travel intervehicle upper limit distance Dv_2 as a predetermined upper limit distance larger than the set during-vehicle-stop intervehicle distance $Dv\_1$ (Yes at step S152 in FIG. 6), the self-driving controller 20 switches the in-traffic-jam self-driving control to the basic self-driving control (step S153 in FIG. 6).

The specific configuration for performing the above-described vehicle control method is provided by the vehicle control system 10.

While the embodiment of the present invention has been described above, the above-described embodiment only shows part of application examples of the present invention and is not intended to limit the technical scope of the present invention to the specific configurations of the above-described embodiment.

For example, in the above-described embodiment, the description has been given of the example in which as the low torque travel control that causes the host vehicle to travel by a drive torque lower than a drive torque determined based on the basic self-driving control, the creep travel control that causes the vehicle to travel using as the driving force the creep torque in the vehicle in which the engine is used as the drive source is performed. However, the low torque travel control is not limited to the creep travel control as long as it is self-driving control that is performed in terms of suppressing the fuel consumption by causing the host vehicle to travel by a lower drive torque (lower output) compared to the case where the host vehicle is controlled based on the basic self-driving control in a traffic jam.

For example, in terms of causing the host vehicle to start and travel at a vehicle speed corresponding to the creep vehicle speed in the low torque travel control, when a drive torque higher than the creep torque is required according to the state (asphalt, gravel, snowy road, slope) of a travel lane on which the host vehicle is traveling, the host vehicle may be caused to travel by this required drive torque instead of the creep torque.

Even in this case, like in the case of the above-described embodiment, it is possible to suppress an excessive increase in the intervehicle distance Dv that is caused by the continuation of the low torque travel control even though the intervehicle distance Dv is increased to be equal to or larger than a certain value, and to suppress cutting in line by another vehicle between the preceding vehicle and the host vehicle that is otherwise caused thereby.

Further, in the above-described embodiment, the description has been given of the example in which the host vehicle is a vehicle using an engine as a drive source, but the configuration of this embodiment can be similarly applied even to the case where the host vehicle is an electric vehicle using an electric motor as a drive source, or a hybrid vehicle using an electric motor and an engine as drive sources.

More specifically, when the host vehicle is the electric vehicle or the hybrid vehicle using the electric motor as the drive source, in the above-described low torque travel control, the self-driving controller 20 calculates as a target torque of the electric motor the drive torque corresponding to the creep torque or the required drive torque higher than the creep torque according to the state of the travel lane, and controls various actuators such as an inverter so as to realize the calculated target torque.

That is, also in the case of the electric vehicle, in terms of improving the convenience for parking in a garage, starting on a slope, or the like, and suppressing a sense of incongruity given to a driver due to the difference in driving feeling compared to the vehicle using the engine as the drive source (particularly the vehicle equipped with a transmission mechanism that causes a creep phenomenon, such as a torque converter), the self-driving controller 20 controls, in the low torque travel control, the travel of the host vehicle so as to reproduce the creep torque that is generated in the idling state in the vehicle using the engine as the drive source. Therefore, like in the case of the above-described embodiment, the fuel consumption (electricity consumption) is improved in the low torque travel control compared to the case where the host vehicle is controlled based on the basic self-driving control.

Then, like the process described at step S153 in FIG. 3, when the intervehicle distance Dv exceeds the predetermined upper limit distance (the creep travel intervehicle upper limit distance $Dv\_2$), the self-driving controller 20 ends the low torque travel control and performs control to shift to the intervehicle maintaining control (step S141 in FIG. 3).

Consequently, even in the case where the host vehicle uses the electric motor as the drive source, like in the case of the above-described embodiment, it is possible to suppress an excessive increase in the intervehicle distance Dv that is caused by the continuation of the low torque travel control even though the intervehicle distance Dv is increased to be equal to or larger than a certain value, and to suppress cutting in line by another vehicle between the preceding vehicle and the host vehicle that is otherwise caused thereby.

The flow of the control illustrated by the flowcharts of FIGS. 2, 3, and 6 is only by way of example and can be changed in various ways within the technical scope of the present invention. For example, the set during-vehicle-stop intervehicle distance $Dv\_1$ used in the determination at step S120 in FIG. 2, the set during-vehicle-stop intervehicle distance $Dv\_1$ used in the determination at step S144 in FIG. 3, and the set during-vehicle-stop intervehicle distance $Dv\_1$ used in the determination at step S154 in FIG. 6 may be set to different values from each other.

Specifically, in the above-described embodiment, the set during-vehicle-stop intervehicle distance $Dv\_1$ in the determination at step S120 is used as a reference of the intervehicle distance Dv at which the host vehicle should be started from the stop state regardless of the presence/absence of a traffic jam.

The set during-vehicle-stop intervehicle distance $Dv\_1$ in the determination at step S144 is used as a reference of the intervehicle distance Dv in a stop determination of the host vehicle in the deceleration control. Further, the set during-vehicle-stop intervehicle distance $Dv\_1$ in the determination at step S154 is used as a reference of the intervehicle distance Dv in a stop determination of the host vehicle in the creep travel control.

Therefore, although the respective determinations each use the set during-vehicle-stop intervehicle distance $Dv\_1$ as the reference, the meanings of the determinations differ from each other. Taking into account the difference between the meanings in the respective determinations, different reference values of the intervehicle distance Dv may be respectively applied thereto.

Likewise, as long as it is possible to realize the effect of suppressing cutting in line by another vehicle, the creep travel intervehicle upper limit distance $Dv\_2$ is not limited to the value (corresponding to three vehicles) described in the above-described embodiment and can be set to another fixed value or a variable value. For example, it is conceivable that when the vehicle speed $Vs\_s$ of the host vehicle or the vehicle speed $Vs\_a$ of the preceding vehicle is relatively high, the possibility of cutting in line by another vehicle is lowered even at the same intervehicle distance Dv compared to the case where it is relatively low. Paying attention to this point, the magnitude of the creep travel intervehicle upper limit distance Dv_2 may be corrected as appropriate based on the magnitude of the vehicle speed Vs_s of the host vehicle, the magnitude of the vehicle speed Vs_a of the preceding vehicle, or the magnitudes of both of them.

Further, it is conceivable that the creep vehicle speed differs according to the state (asphalt, gravel, snowy road, slope) of the travel lane. Accordingly, if the creep travel intervehicle upper limit distance Dv_2 is set as a fixed value, it is conceivable that when the creep vehicle speed is lowered according to the state of the travel lane as described above, the vehicle speed difference ΔVs further increases so that the intervehicle distance Dv further increases. Taking into account this point, correction may be made to change the creep travel intervehicle upper limit distance Dv_2 according to the state of the travel lane. Specifically, by performing correction such that the creep travel intervehicle upper limit distance Dv_2 decreases as the creep vehicle speed decreases according to the state of the travel lane, it is possible to more reliably obtain the effect of suppressing cutting in line by another vehicle even in the state of the travel lane where the creep vehicle speed is lowered.

The invention claimed is:

1. A vehicle control method for automatically controlling travel of a host vehicle, the vehicle control method comprising:
    receiving traffic jam information from an outside of the host vehicle, the traffic jam information indicating whether or not a travel lane of the host vehicle is jammed;
    in response to determining, based on the traffic jam information, that the travel lane is not jammed, performing basic self-driving control including intervehicle maintaining control configured to maintain an intervehicle distance between the host vehicle and a preceding vehicle at a predetermined target intervehicle distance;
    in response to determining, based on the traffic jam information, that the travel lane is jammed, performing in-traffic-jam self-driving control, the in-traffic-jam self-driving control including selecting one of the intervehicle maintaining control or low torque travel control configured to cause the host vehicle to travel by a low drive torque lower than a drive torque determined based on the basic self-driving control;
    the in-traffic-jam self-driving control further including:
        executing the low torque travel control in response to determining that the intervehicle distance becomes equal to or less than a predetermined upper limit distance, the predetermined upper limit distance being set larger than the predetermined target intervehicle distance, and
        executing the intervehicle maintaining control in response to determining that the intervehicle distance exceeds the predetermined upper limit distance.

2. The vehicle control method according to claim 1, wherein the predetermined upper limit distance is set to a magnitude that is determined in terms of suppressing cutting in line by another vehicle between the host vehicle and the preceding vehicle.

3. The vehicle control method according to claim 2, further comprising stopping the host vehicle when the intervehicle distance becomes equal to or less than a set during-vehicle-stop intervehicle distance in the in-traffic-jam self-driving control, the set during-vehicle-stop intervehicle distance serving as a reference for start or stop of the host vehicle.

4. A vehicle control system for automatically controlling travel of a host vehicle, the vehicle control system comprising:
    an intervehicle distance acquisition device configured to acquire an intervehicle distance between the host vehicle and a preceding vehicle;
    a traffic jam information acquisition device configured to acquire traffic jam information from an outside of the host vehicle, the traffic jam information indicating whether or not a travel lane of the host vehicle is jammed; and
    a self-driving controller programmed to control the travel of the host vehicle based on the intervehicle distance and the traffic jam information,
    wherein the self-driving controller is programmed to:
        when it is determined based on the traffic jam information that the travel lane is not jammed, perform basic self-driving control including intervehicle maintaining control configured to maintain the intervehicle distance between the host vehicle and the preceding vehicle at a predetermined target intervehicle distance;
        when it is determined based on the traffic jam information that the travel lane is jammed, perform in-traffic-jam self-driving control, the in-traffic-jam self-driving control including selecting one of the intervehicle maintaining control or low torque travel control configured to cause the host vehicle to travel by a low drive torque lower than a drive torque determined based on the basic self-driving control;
        the in-traffic-jam self-driving control further including:
            executing the low torque travel control when the intervehicle distance becomes equal to or less than a predetermined upper limit distance, the predetermined upper limit distance being set larger than the predetermined target intervehicle distance, and
            executing the intervehicle maintaining control when the intervehicle distance exceeds the predetermined upper limit distance.

* * * * *